(12) United States Patent
Wardlaw et al.

(10) Patent No.: US 10,685,176 B2
(45) Date of Patent: Jun. 16, 2020

(54) TEMPLATE-BASED REQUIREMENT AUTHORING AND REFERENCE-BASED COMPONENT REQUIREMENT VIEWER

(71) Applicant: The Boeing Company, Chicago, IL (US)

(72) Inventors: William Scott Wardlaw, Huntsville, AL (US); Paul Murray, Huntsville, AL (US); Michael E. Crow, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 127 days.

(21) Appl. No.: 16/058,621

(22) Filed: Aug. 8, 2018

(65) Prior Publication Data

US 2020/0050656 A1     Feb. 13, 2020

(51) Int. Cl.
    *G06F 40/186*   (2020.01)
    *G06F 3/0482*   (2013.01)
    *G06F 16/93*    (2019.01)

(52) U.S. Cl.
    CPC .......... *G06F 40/186* (2020.01); *G06F 3/0482* (2013.01); *G06F 16/93* (2019.01)

(58) Field of Classification Search
    CPC ....... G06F 40/186; G06F 16/93; G06F 3/0482
    See application file for complete search history.

(56) References Cited

U.S. PATENT DOCUMENTS

| | | | |
|---|---|---|---|
| 9,086,824 B1* | 7/2015 | Gimnich | G06F 8/20 |
| 2005/0065975 A1* | 3/2005 | McDonald | G06F 40/35 |
| 2005/0160070 A1* | 7/2005 | Mashni | G06F 40/186 |
| 2011/0213757 A1* | 9/2011 | Bhaskaran | G06Q 10/06 707/687 |
| 2011/0213808 A1* | 9/2011 | Rheaume | G06F 16/93 707/802 |
| 2013/0205190 A1* | 8/2013 | Kossmann | G06F 16/367 715/225 |

* cited by examiner

*Primary Examiner* — Daniel Samwel
(74) *Attorney, Agent, or Firm* — MH2 Technology Law Group LLP

(57) ABSTRACT

A computer system and a computer-implemented method is provided for authoring a requirements document for a product or service. The requirements document includes one or more components for the product or service. Each component is described using one or more requirements statements. An online tool is used to provide electronic templates to view and/or modify features of the requirement statements. A common data structure is used to store attributes associated with portions of the requirements statements. The common data structure is accessible by the online tool to author the requirements document.

20 Claims, 18 Drawing Sheets

| ID Number | Name / Definition | Verification | DOORS | ReqFoundry |
|---|---|---|---|---|
| 1 | Traffic Light System | | | |
| 1.1 | Traffic Light System Controller (TLS Controller) | | | |
| 1.1-1 | The *TLS Controller* shall transition from *Highway Red Farmroad Yellow* upon receipt of valid Farmroad Vehicle Absent. | Analysis | | x |
| 1.1-2 | The *TLS Controller* Traffic Light System Controller State Machine for a simple traffic light model in to *Highway Green Farmroad Red* upon receipt of valid Timeup. | TBD | | x |
| 1.1-3 | The *TLS Controller* shall transition from *Highway Green Farmroad Red* to *Highway Yellow Farmroad Red* upon receipt of valid Farmroad Vehicle Detected. | Analysis | | x |
| 1.1-4 | The *TLS Controller* shall transition from *Highway Yellow Farmroad Red* to *Highway Red Farmroad Green* upon receipt of valid Timeup. | Analysis | | x |
| 1.1-5 | The *TLS Controller* shall send Highway Red upon entering *Highway Red Farmroad Green*. | Inspection | | x |
| 1.1-6 | The *TLS Controller* shall send Farmroad Green upon entering *Highway Red Farmroad Green*. | Inspection | | x |
| 1.1-7 | The *TLS Controller* shall send Farmroad Yellow upon entering *Highway Red Farmroad Yellow*. | Inspection | | x |
| 1.1-8 | The *TLS Controller* shall send Highway Green upon entering *Highway Green Farmroad Red*. | Inspection | | x |
| 1.1-9 | The *TLS Controller* shall send Farmroad Red upon entering *Highway Green Farmroad Red*. | Inspection | | x |
| 1.1-10 | The *TLS Controller* shall send Highway Yellow upon entering *Highway Yellow Farmroad Red*. | Inspection | | x |
| 1.1-11 | The *TLS Controller* shall transition to *Highway Green Farmroad Red* upon Initialization. | Test | | x |
| 1.1-12 | The *TLS Controller* shall send Start Timer upon entering *Highway Red Farmroad Yellow* or entering *Highway Yellow Farmroad Red*. | Test, Analysis | | x |
| 1.2 | Timer | | | |
| 1.2-1 | The *Timer* shall transition to *Idle* upon Initialization. | Demonstration | | x |
| 1.2-2 | The *Timer* shall transition from *Idle* to *Counting Down* upon receipt of valid Start Timer. | Demonstration | | x |
| 1.2-3 | The *Timer* shall send Timeup upon entering *Idle*. | Demonstration | | x |
| 1.3 | Sensor | | | |
| 1.3-1 | The *Sensor* shall transition to *No Vehicle Present* upon Initialization. | Demonstration | | x |
| 1.3-2 | The *Sensor* shall transition from *No Vehicle Present* to *Vehicle Present* upon Vehicle Arrives At Intersection. | Demonstration | | x |
| 1.3-3 | The *Sensor* shall transition from *Vehicle Present* to *No Vehicle Present* upon Vehicle Clears Intersection. | Demonstration | | x |
| 1.3-4 | The *Sensor* shall send Farmroad Vehicle Detected upon entering *Vehicle Present*. | Inspection | | x |

| Browse ▾ | Search | Import / Export | Notifications | Analysis | | Traffic Light System Context | Wardlaw, Scott | ReqFoundry |
|---|---|---|---|---|---|---|---|---|
| ID Number | Name / Definition | | | | | | Verification | DOORS |
| ▸ 1 | Traffic Light System | | | | | | | [x] [+] |
| ▸ 1.1 | Traffic Light System Controller (TLS Controller) | | | | | | | [x] [+] |
| 1.1-1 | The *TLS Controller* shall transition from *Highway Red Farmroad Green* to *Highway Red Farmroad Yellow* upon receipt of valid Farmroad Vehicle Absent. | | | | | | Analysis | [x] |
| 1.1-2 | The *TLS Controller* shall transition from *Highway Red Farmroad Green* to *Highway Green Farmroad Red* upon receipt of valid Timeup. | | | | | | TBD | [x] |
| 1.1-3 | The *TLS Controller* shall transition from *Highway Green Farmroad Red* to *Highway Yellow Farmroad Red* upon receipt of valid Farmroad Vehicle Dete 400 | | | | | | Analysis | [x] |
| 1.1-4 | The *TLS Controller* shall transition from *Highway Yellow Farmroad Red* to *Highway Red Farmroad Green* upon receipt of valid Timeup. | | | | | | Analysis | [x] |
| 1.1-5 | The *TLS Controller* shall send Highway R 402 entering *Highway* 404 armroad Green. 405 | | | | | | Inspection | [x] |
| 1.1-6 | The *TLS Controller* shall send Farmroad Green upon entering *Highway Red Farmroad Green*. | | | | | | Inspection | [x] |
| 1.1-7 | The *TLS Contro* Name: transition | | | | | 2018-4-17 8:53:12 | Inspection | [x] |
| 1.1-8 | The *TLS Contro* Definition: Change from one state to another state. | | | | | | Inspection | [x] |
| 1.1-9 | The *TLS Control* Synonyms: go, goes, change, switch, move, enter, exit, initialize | | | | | | Inspection | [x] |
| 1.1-10 | The *TLS Control* Template: (from STATE) to STATE (within a BOUNDARY of VALUE) upon EVENT | | | | | | Inspection | [x] |
| 1.1-11 | The *TLS Control* FUNCTION 942 | | | | | Wardlaw, Scott | Test | [x] |
| 1.1-12 | The *TLS Control* | | | | | [DELETE] [CANCEL] [SAVE] | Test,Analysis | [x] |
| ▸ 1.2 | Timer | | | | | | | [x] [+] |
| 1.2-1 | The *Timer* shall transition to *Idle* upon *Initialization*. | | | | | | Demonstration | [x] |
| 1.2-2 | The *Timer* shall transition from *Idle* to *Counting Down* upon receipt of valid Start Timer. | | | | | | Demonstration | [x] |
| 1.2-3 | The *Timer* shall send Timeup upon entering *Idle*. | | | | | | Demonstration | [x] |
| ▸ 1.3 | Sensor | | | | | | | [x] [+] |
| 1.3-1 | The *Sensor* shall transition to *No Vehicle Present* upon *Initialization*. | | | | | | Demonstration | [x] |
| 1.3-2 | The *Sensor* shall transition from *No Vehicle Present* to *Vehicle Present* upon Vehicle Arrives At Intersection. | | | | | | Demonstration | [x] |
| 1.3-3 | The *Sensor* shall transition from *Vehicle Present* to *No Vehicle Present* upon Vehicle Clears Intersection. | | | | | | Demonstration | [x] |
| 1.3-4 | The *Sensor* shall send Farmroad Vehicle Detected upon entering *Vehicle Present*. | | | | | | Inspection | [x] |

| Browse ▾ | Search | Import / Export | Notifications | Analysis | Traffic Light System Context | | Wardlaw, Scott | ReqFoundry |
|---|---|---|---|---|---|---|---|---|
| ID Number | Name / Definition | | | | | | Verification | DOORS |
| ▷ 1 | Traffic Light System | | | | | | | |
| ▷ 1.1 | Traffic Light System Controller (TLS Controller) | | | | | | | |
| 1.1-1 | The *TLS Controller* shall transition from *Highway Red Farmroad Green* to *Highway Red Farmroad Yellow* upon receipt of valid Farmroad Vehicle Absent. | | | | | | Analysis | |
| 1.1-2 | The *TLS Controller* shall transition from *Highway Red Farmroad Green* to *Highway Green Farmroad Red* upon receipt of valid Timeup. | | | | | | TBD | |
| 1.1-3 | The *TLS Controller* shall transition from *Highway Green Farmroad Red* to *Highway Yellow Farmroad Red* upon receipt of valid Farmroad Vehicle Detected. | | | | | | Analysis | |
| 1.1-4 | The *TLS Controller* shall transition from *Highway Yellow Farmroad Red* to *Highway Red Farmroad Green* upon receipt of valid Timeup. | | | | | | Analysis | |
| 1.1-5 | The *TLS Controller* shall send Highway Red upon entering *Highway Red Farmroad Green*. | | | | | | Inspection | |
| 1.1-6 | The *TLS Controller* shall send Farmroad Green upon entering *Highway Red Farmroad Green*. | | | | | | Inspection | |
| 1.1-7 | The *TLS Controller* shall send Farmroad Yellow upon entering *Highway Red Farmroad Yellow*. | | | | | | Inspection | |
| 1.1-8 | The *TLS Controller* shall send Highway Green upon entering *Highway Green Farmroad Red*. | | | | | | Inspection | |
| 1.1-9 | The *TLS Controller* shall send Farmroad Red upon entering *Highway Green Farmroad Red*. | | | | | | Inspection | |

The *Timer* shall transition from STATE to STATE within a BOUNDARY of VALUE upon EVENT under these conditions: CONDITION.

Requirement Details
Section ID: (Traffic Light System Context) 1.2.4

Verification Method:
- Inspection
- Analysis
- Demonstration
- Test

Access Control:
- No Restriction
- U.S. Persons Only
- Boeing Only
- Boeing U.S. Only Use Short Names: ☑

700

CANCEL  SAVE

| Browse | Search | Import / Export | Notifications | Analysis | Traffic Light System Context | | Wardlaw, Scott | ReqFoundry |
|---|---|---|---|---|---|---|---|---|
| ID Number | Name / Definition | | | | | | Verification | DOORS |
| 1 | Traffic Light System | | | | | | | |
| 1.1 | Traffic Light System Controller (TLS Controller) | | | | | | | |
| 1.1-1 | The *TLS Controller* shall transition from *Highway Red Farmroad Green* to *Highway Red Farmroad Yellow* upon receipt of valid Farmroad Vehicle Absent. | | | | | | Analysis | |
| 1.1-2 | The *TLS Controller* shall transition from *Highway Red Farmroad Green* to *Highway Green Farmroad Red* upon receipt of valid Timeup. | | | | | | TBD | |
| 1.1-3 | The *TLS Controller* shall transition from *Highway Green Farmroad Red* to *Highway Yellow Farmroad Red* upon receipt of valid Farmroad Vehicle Detected. | | | | | | Analysis | |
| 1.1-4 | The *TLS Controller* shall transition from *Highway Yellow Farmroad Red* to *Highway Red Farmroad Green* upon receipt of valid Timeup. | | | | | | Analysis | |
| 1.1-5 | The *TLS Controller* shall send Highway Red upon entering *Highway Red Farmroad Green*. | | | | | | Inspection | |
| 1.1-6 | The *TLS Controller* shall send Farmroad Green upon entering *Highway Red Farmroad Green*. | | | | | | Inspection | |
| 1.1-7 | The *TLS Controller* shall send Farmroad Yellow upon entering *Highway Red Farmroad Yellow*. | | | | | | Inspection | |
| 1.1-8 | The *TLS Controller* shall send Highway Green upon entering *Highway Green Farmroad Red*. | | | | | | Inspection | |

The *Timer* shall transition from *Idle* to *Counting Down* upon receipt of valid Start Timer under these conditions: CONDITION.

ctrl + enter:

Verification Method:
- Inspection
- Analysis
- Demonstration
- Test

Access Control:
- No Restriction
- U.S. Persons Only
- Boeing Only
- Boeing U.S. Only Requirement Details
Section ID: (Traffic Light System Context) 1.2-4

Use Short Names:

CANCEL | SAVE

FIG. 12

TEMPLATE-BASED REQUIREMENT AUTHORING AND REFERENCE-BASED COMPONENT REQUIREMENT VIEWER

FIELD

This disclosure relates generally to requirements documents, and more particularly, to a template-based requirement authoring and reference-based component requirement viewer.

BACKGROUND

A requirements document is a document containing all the requirements to a certain product or service. It is written to allow people to understand what a product should do. A requirements document should, however, generally avoid anticipating or defining how the product will do it in order to later allow interface designers and engineers to use their expertise to provide the optimal solution to the requirements. Requirements are often difficult for even a knowledgeable person to understand and nearly impossible for software applications to use them in an impactful way.

SUMMARY

In accordance with examples of the present disclosure, a computer-implemented method and a computer system that is configured to perform the computer-implemented method is provided. The computer-implemented method for authoring a requirements document for a product or service comprises providing, by a hardware processor, a graphic user interface for authoring the requirements document on a computer display, wherein the graphical user interface provides one or more selectable electronic templates that are stored in a template database; accessing, by the hardware processor, an electronic requirements document from computer system, wherein the electronic requirements document comprises a section for a component of the product or service; selecting a requirements statement from the section; causing, by the hardware processor, an electronic template to be provided for data entry based on the selecting; causing, by the hardware processor, a subject and a verb to be displayed on the display in a field of the electronic template based on the section to describe a requirement for the component; obtaining a function word to be added after the verb to describe a function for the component; providing, in a selectable window, one or more recommended function words associated with the subject, wherein the one or more functions describe an action of subject; obtaining a selection of a recommended function word of the one or more function recommended function words; providing a clause for the recommended function word, wherein the clause comprises one or more words that can be selected to provide recommended replacement words; and causing, by the hardware processor, the electronic requirements document as modified to be displayed on a computer display.

In some examples, the one or more words in the clause that can be selected are provided in all capitals. In some examples, the one or more words in the clause are uniquely identifiable for the word's context for the user to enter text, to which, related suggested words could be displayed. In some examples, the computer-implemented method further comprises, causing, by the hardware processor, words in the requirement statement to be displayed in a format that is based on a context of each word. In some examples, the format is a color, a font, a border, a shape, a highlight, or combinations thereof. In some examples, the computer-implemented method further comprises storing the electronic requirements document in a storage medium, wherein one or more words in the requirements statement are stored as a single instance inside a data structure that is referenced by other electronic requirement documents that use the one or more words. In some examples, the computer-implemented method further comprises determining, by the hardware processor, units associated with a word in the requirement statement match units defined in the electronic template. In some examples, the computer-implemented method further comprises assigning an acronym to one or more words of specific context, wherein the acronym and the one or more words of specific context are stored as a common data structure in a storage medium. In some example, the computer-implemented method further comprising associating a keyboard entries to each of the one or more recommended function word for selection of the one or more recommended function word. In some examples, the requirements statement that is selected comprises obtaining a selection of an identifier associated with the requirement statement. In some examples, the computer-implemented method further comprises assigning an acronym to the subject, wherein the acronym and the subject are stored as a common data structure in a storage medium. In some examples, the requirements statement for the section has a first word that is selectable for modification and remaining words in the requirements statement not initially selectable for modification. In some examples, a change in a word in the requirements statement is changed in other requirements documents that use the word. In some examples, a data structure that stores the subject is associated with a data structure for each of word of the clause. In some examples, a change in one or more words of specific context in the requirements statement are changed in other requirements documents that reference the same one or more words of specific context. In some examples, the source for the one or more functions can come from existing requirements, user input, or other sources such as a document with a list of words of a certain type.

In accordance with examples of the present disclosure, a database and a computer-implemented method of storing data for an electronic requirements document, the computer=implemented method comprising creating, by a hardware processor, a first data structure to store data for a first word in a first requirements statement for a first electronic requirements document; creating, by the hardware processor, a second data structure to store data for a second word in the first requirements statement for the first electronic requirements document, wherein the second word describes a function of the first word; associating the first data structure with the second data structure; obtaining a change in for the first word; and modifying, by the hardware processor, the first data structure based on the change that was obtained, wherein the first data structure that is modified is reflected in a second requirements document that uses the first word.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 1 shows a requirements document 100 for a traffic light system 102, in accordance with examples of the present disclosure;

FIG. 2 shows a header dialog box 200 for a sub-system, in accordance with examples of the present disclosure;

FIG. 3 shows a component dialog box 300 for a component of a requirement of the requirements document 100, in accordance with examples of the present disclosure;

FIG. 4 shows a function dialog box 400 for a particular function, in accordance with examples of the present disclosure;

FIG. 5 shows another function dialog box 500 for a particular function that is similar to that shown in FIG. 4, in accordance with examples of the present disclosure;

FIG. 6 shows an authoring dialog box 600 for suggestion of alternates, in accordance with examples of the present disclosure;

FIG. 7 shows an authoring dialog box 700 for the function chosen in FIG. 6, in accordance with examples of the present disclosure;

FIG. 9 shows an authoring dialog box 900 for a skip optional components using the example of FIGS. 6-8, in accordance with examples of the present disclosure;

FIG. 10 shows an authoring dialog box 1000 for options for EVENT using the example of FIGS. 6-9, in accordance with examples of the present disclosure;

FIG. 11 shows an authoring dialog box 1100 for option to chain events using the example of FIGS. 6-10, in accordance with examples of the present disclosure;

FIG. 12 shows an authoring dialog box 1200 for option to add conditions using the example of FIGS. 6-11, in accordance with examples of the present disclosure;

DESCRIPTION OF THE EMBODIMENTS

Figure 8:
FIG. 8 shows an authoring dialog box 800 for a suggestion by type using the example of FIGS. 6 and 7, in accordance with examples of the present disclosure.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Requirement quality has long been an issue of large programs. Generally speaking, examples of the present disclosure addresses problems associated with completing and analyzing individual requirement statements in a requirement documents by enabling contextual analysis and automation where meaning is assigned to the individual components of the requirement sentences. Implementation of the example of the present disclosure provides a variety of benefits. The present disclosure provides for an increase in the quality level of requirements without adding additional time and burden to the authoring process. In fact, the present disclosure provides for a reduction in authoring time by a significant margin. Naming consistency has also been an issue in the conventional techniques. The present disclosure reduces or eliminates the naming problem by suggesting names from previously authored requirements and other authoritative sources. The present disclosure is also able to provide for the functionality that numeric values have units and that the name of the units is realized to a known unit name. As a result of aspects of the present disclosure, quality is improved by enabling real-time feedback and validation for completeness.

Accordingly, examples of the present disclosure provide for a computer-implemented method and computer system for fluidly authoring text-based requirements that are componentized into data structures or objects of known type and order using an online authoring tool or wizard that provide one or more electronic template in which the user can use to author the requirements document. The contextual analysis processes the individual requirement statements by componentizing the sentence into known object types and provides the ability to re-use the same instance of a referenced object. The method and system allow for suggestions to be provided and auto-completion of components of the requirement sentence. The dynamic templating ensures that the requirement meets or exceeds a level of completion and quality while still allowing the author to be somewhat flexible in the wording of the requirement.

Moreover, examples of the present disclosure provide for a method and system for storing and viewing text-based requirements by componentizing the sentence into uniquely typed and ordered objects according to a pre-defined template. The method and system are then able to visually differentiate the types of objects to the end-user and provide the most up-to-date text of each component from the linked references. Additionally, the method and system allow for these objects to be re-used by reference within other requirements.

By storing the componentized objects by reference, these objects can be re-used in multiple requirements, thus creating links between disparate requirements at differing hierarchical levels. These links or relationships enable immediate impact analysis of changing values and terms within requirements. These relationships also enable test coverage optimization and earlier safety risk exposure. The ability for the software to know when an object is a value allows the software to require and suggest units to accompany the number. Automation is now possible, such as software that can establish and continuously update trace data between these text-based requirements and external models.

The present disclosure improves requirement quality and reduce authoring time. The combination of these two features is a significant improvement over all known solutions internal and external. Additionally, the system creates requirement data in a format that enables automation and analysis. This machine understanding will enable other solutions, such as real-time quality analysis, automated contextual analysis, semi-automated linking and tracing, etc. The software object describing requirements can be stored in a central database for analysis, distribution, and modification. Sub-requirements can use pointers to the objects to obtain requirements data.

Requirement statements are created in text form and stored in a graph database. A single requirement statement may be applied to several hundred subsystems. This results in situations where 1) any change to a requirement having dependent requirements requires changes to all dependent requirements; 2) the results of a system exceeding a particular requirement does not advance all other requirements (for example, A weight saving on one system does not necessarily mean a different system with weight challenges will not be allocated more weight); and 3) the entirety of all requirements cannot be easily analyzed without significant human labor.

Requirement statements are generated such that a text statement is converted into a software object having a particular set of attributes (for example, Weight is an integer having a specific range as described by the requirement). This results in improved traceability, visualization, and communication. An automated text recommendation engine can be used to create and/or analyze text based requirement statements. These statements are then converted to a software object having varying attributes for subsequent analysis. Using real-time text analysis to suggest terms as requirements are written such that the terms support the creation of software objects describing the requirement.

In order to illustrate aspects of the present disclosure, a requirements document for a traffic light system will be discussed below. FIG. 1 shows a requirements document 100 for a traffic light system 102, in accordance with examples of the present disclosure. The traffic light system 102 comprises the following sub-systems: traffic light system controller (TLS controller) 104, timer 106, and sensor 108. The TLS controller 104 comprises twelve separate requirement statements 110-132, the timer 106 comprises three separate requirement statements 134-138, and the sensor 108 comprises four separate requirement statements 140-146.

The TLS controller 104 includes the following requirement statements: The TLS Controller shall transition from Highway Red Farmroad Green to Highway Red Farmroad Yellow upon receipt of valid Farmroad Vehicle Absent 110; The TLS Controller . . . Green Farmroad Red upon receipt of valid Timeup 112; The TLS Controller shall transition from Highway Green Farmroad Red to Highway Yellow Farmroad Red upon receipt of valid Farmroad Vehicle Detected 114; The TLS shall transition from Highway Yellow Farmroad Red to Highway Red Farmroad Green upon receipt of valid Timeup 116; The TLS Controller shall send Highway Red upon entering Highway Red Farmroad Green 118; The TLS Controller shall send Farmroad Green upon entering Highway Red Farmroad Green 120; The TLS Controller shall send Farmroad Yellow upon entering Highway Red Farmrod Yellow 122; The TLS Controller shall send Highway Green upon entering Highway Green Farmroad Red 124; The TLS Controller shall send Farmroad Red upon entering Highway Green Farmroad Red 126; The TLS Controller shall send Highway Yellow upon entering Highway Yellow Farmroad Red 128; The TLS Controller shall send transition to Highway Green Farmroad Red upon initialization 130; the TLS Controller shall send Start Timer upon entering Highway Red Farmroad Yellow or entering Highway Yellow Farmroad Red 132.

The Timer 106 includes the following requirement statements: The Timer shall transition to Idle upon initialization 134; The Timer shall transition from Idle to Counting Down upon receipt of valid Start Timer 136; and The Timer shall send Timeup upon entering Idle 138.

The Sensor 108 includes the following requirement statements: The Sensor shall transition to No Vehicle Present upon Initialization 140; The Sensor shall transition from No Vehicle Present to Vehicle Present upon Vehicle Arrives At Intersection 142; The Sensor shall transition from Vehicle Present to No Vehicle Present upon Vehicle Clears Intersection 144; and The Sensor shall send Farmroad Vehicle Detected upon entering Vehicle Present 146.

Figure 2:
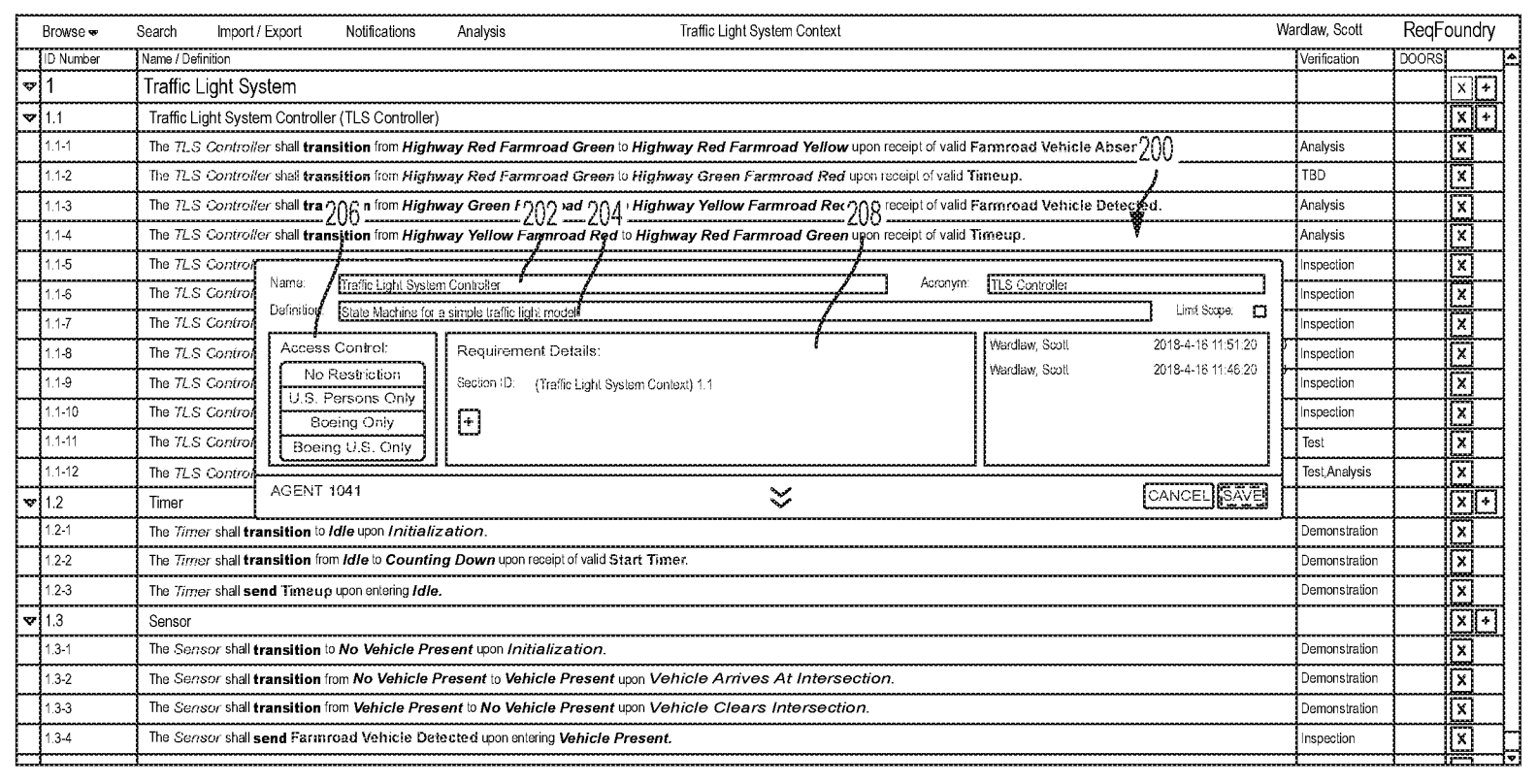

FIG. 2 shows a header dialog box 200 for a sub-system, in accordance with examples of the present disclosure. As shown in FIG. 2, the header dialog box 200 is for the TLS controller 104 and comprises a name field 202 that lists the name of the sub-system listed in the name field 202, a definition field 204 that defines the name in the name field 202, an access control field 206 that provides access selection for the sub-system, and a requirements details field 208. In this example, the name field 202 is "Traffic Light System Controller," the definition field 204 is "State Machine for a single traffic light model," the access control field 206 includes four sub-fields including "No Restriction, U.S. Persons Only, Company Only, and Company U.S. Only," and the requirements details field 208 is "Section ID: (Traffic Light System Context) 1.1."

Figure 3:
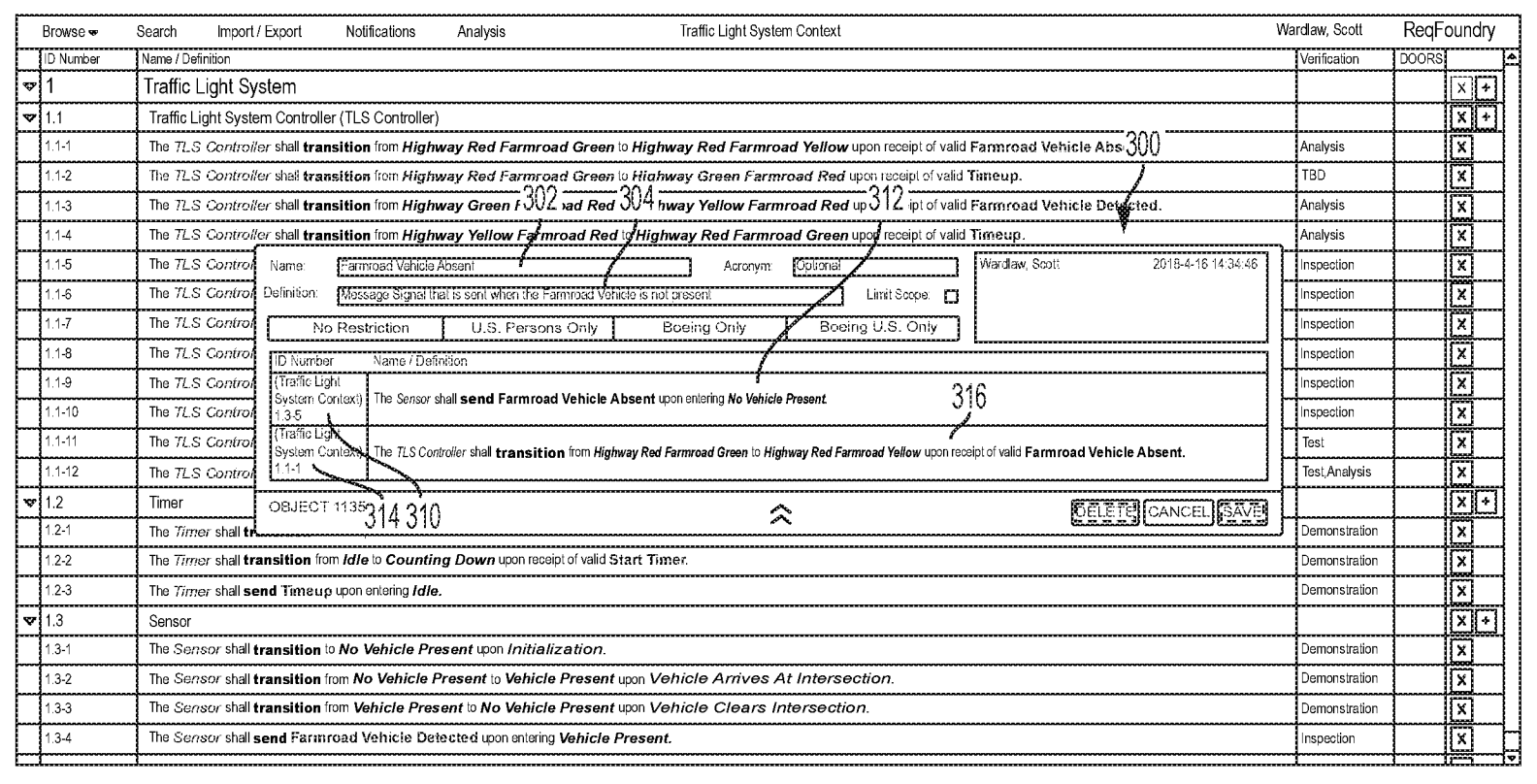

FIG. 3 shows a component dialog box 300 for a component of a requirement of the requirements document 100, in accordance with examples of the present disclosure. As shown in FIG. 3, the component is "Farmroad Vehicle Absent" as shown in a name field 302. A definition field 304 defines the component in the name field 302, and in this example, the definition field 304 is "Message Signal that is sent when the Farmroad Vehicle is not present." For the component "Farmroad Vehicle Absent," two fields 306 and 308 are shown that includes the component "Farmroad Vehicle Absent" in a particular requirement. Field 306 includes ID number sub-field "Traffic Light System Context 1.3-5" 310, a Name/Definition sub-field "The Sensor shall send Farmroad Vehicle Absent upon entering No Vehicle Present" 312. Field 308 includes ID number sub-field "Traffic Light System Context 1.1-1" 314, a Name/Definition sub-field "The TLS Controller shall transition from Highway Red Farmroad Green to Highway Red Farmroad Yellow upon receipt of valid Farmroad Vehicle Absent" 316.

FIG. 4 shows a function dialog box 400 for a particular function, in accordance with examples of the present disclosure. The function dialog box 400 comprises a name field 402 that includes the name of the function, a definition field 404 that provides a definition for the function, a synonyms field 406 includes one or more synonyms for the function, and a template field 408 that includes a sample template for the function. In the example of FIG. 4, the function is "transition" as shown in the name field 402, the definition is "Change from one state to another state," as shown in the definition field 404, the synonyms are "go, goes, change, switch, move, enter, exit, initialize," as shown in the synonyms field 406, and the template is "(from STATE) to STATE (within a BOUNDARY of VALUE) upon EVENT," as shown in the template field 408.

Figure 5:
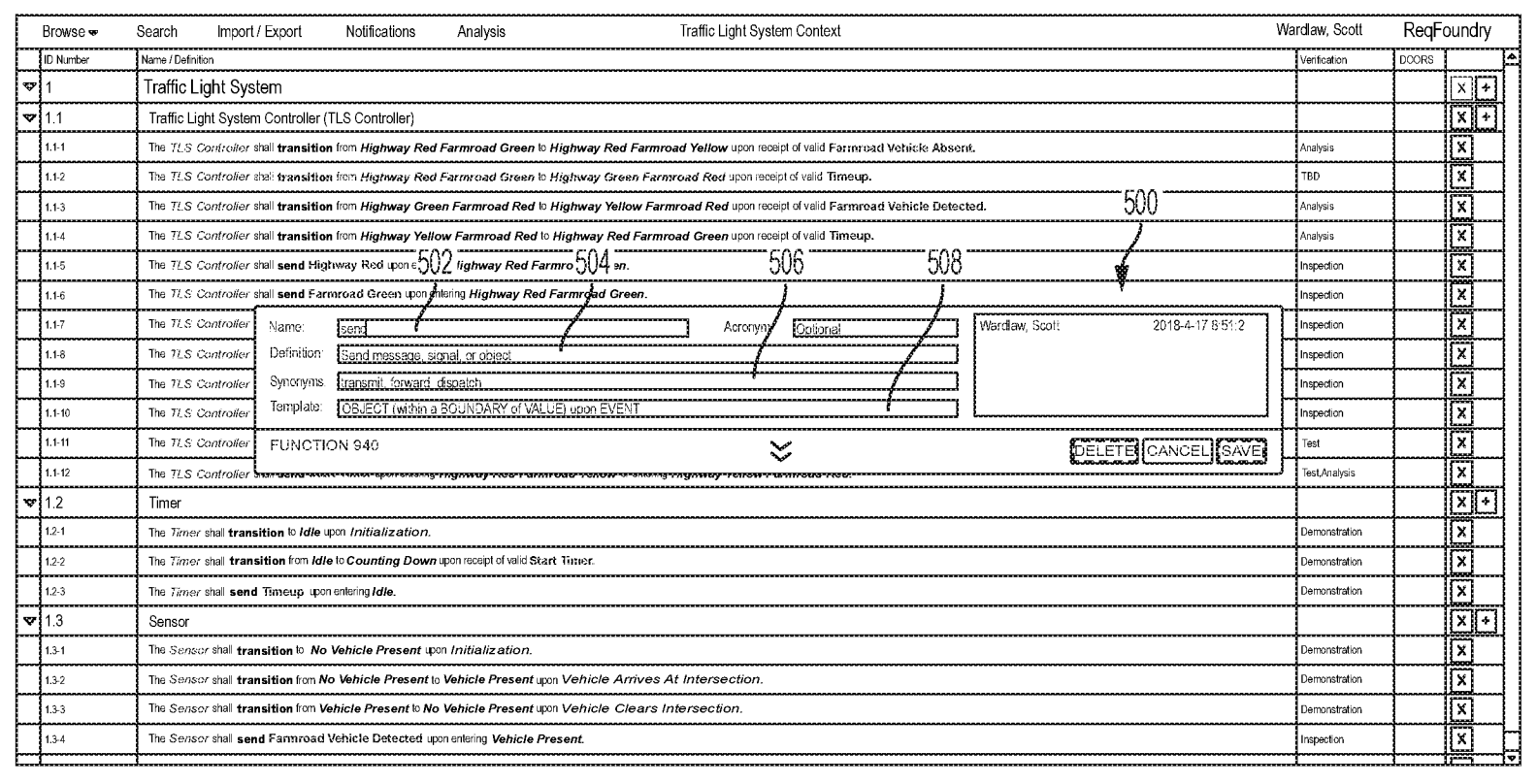

FIG. 5 shows another function dialog box 500 for a particular function that is similar to that shown in FIG. 4, in accordance with examples of the present disclosure. In the example of FIG. 5, the function is "send" as shown in a name field 502, the definition is "Send message, signal, or object,"

as shown in a definition field 504, the synonyms are "transmit, forward, dispatch," as shown in a synonyms field 506, and the template is "OBJECT (within a BOUNDARY of VALUE) upon EVENT," as shown in a template field 508.

Figure 6:
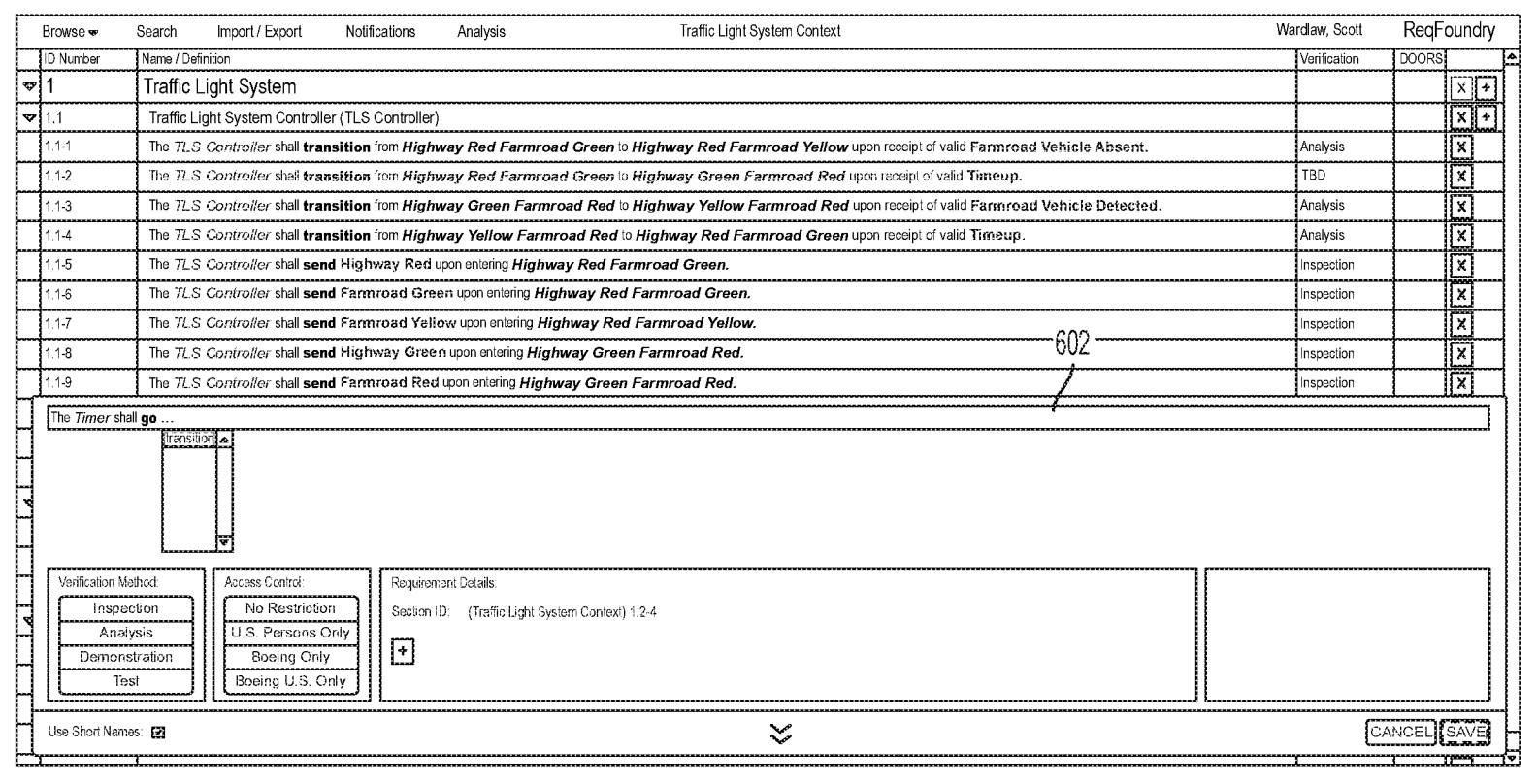

FIG. 6 shows an authoring dialog box 600 for suggestion of alternates, in accordance with examples of the present disclosure. When the user enters the requirement "The Timer shall go" a suggestion of alternatives dialog box 602 can be provided to provide the user with suggestions for the word "go" in the requirement. As shown in FIG. 6, the suggestion "transition" is included in the suggestion of alternatives dialog box 602 that the user can select to replace "go" with "transition" in the requirement.

FIG. 7 shows an authoring dialog box 700 for the function chosen in FIG. 6, in accordance with examples of the present disclosure. As shown in FIG. 7, the word "transition" in the requirement statement "The Timer shall transition," will invoke the phrase "from STATE to STATE within a BOUNDARY of VALUE upon EVENT under these conditions: CONDITION in the authoring dialog box 700.

FIG. 8 shows an authoring dialog box 800 for a suggestion by type using the example of FIGS. 6 and 7, in accordance with examples of the present disclosure. For the word "highway" for the first STATE of FIG. 7, a drop down alternative dialog box 802 is provided with selections from which the user can select. In this example, the state word "highway" can be provided with the following suggestions: Highway Green Farmroad Red, Highway Red Farmroad Yellow, Highway Red Farmroad Green, and Highway Yellow Farmroad Red. Once selected, the requirement statement becomes "The Timer shall transition from highway Green Farmroad Red to STATE within a Boundary of VALUE upon EVENT under these conditions: CONDITION.

Figure 9:
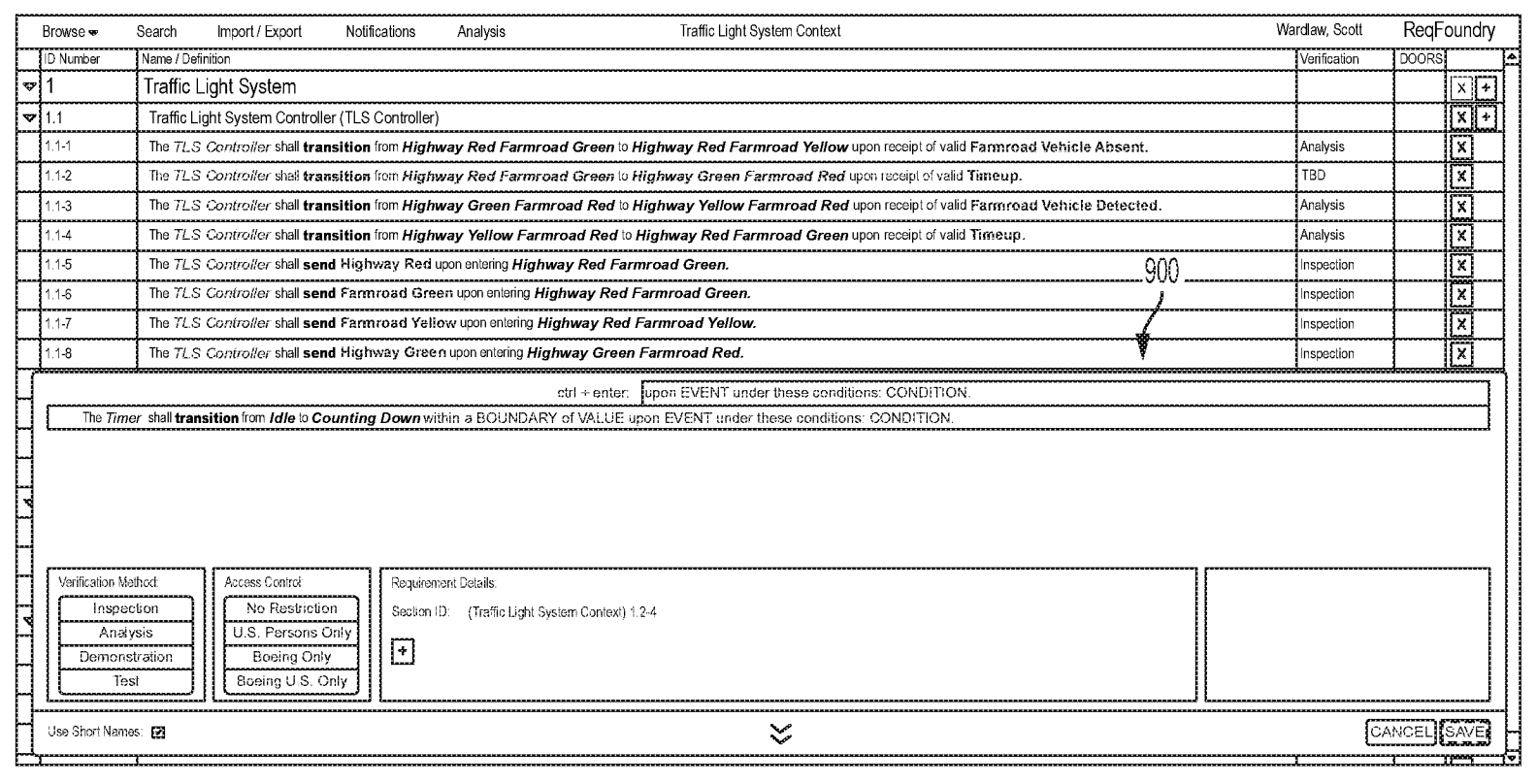

FIG. 9 shows an authoring dialog box 900 for a skip optional components using the example of FIGS. 6-8, in accordance with examples of the present disclosure. The requirement statement "The Timer shall transition from Idle to Counting Down within a BOUNDARY of VALUE upon EVENT under these conditions: CONDITION." In instances that the user wishes to skip entering components to the requirement statement, the user can select an input, such as a key stroke or combination of key strokes (i.e., ctrl+enter), the string "upon EVENT under these conditions: CONDITION" can be provided.

Figure 10:
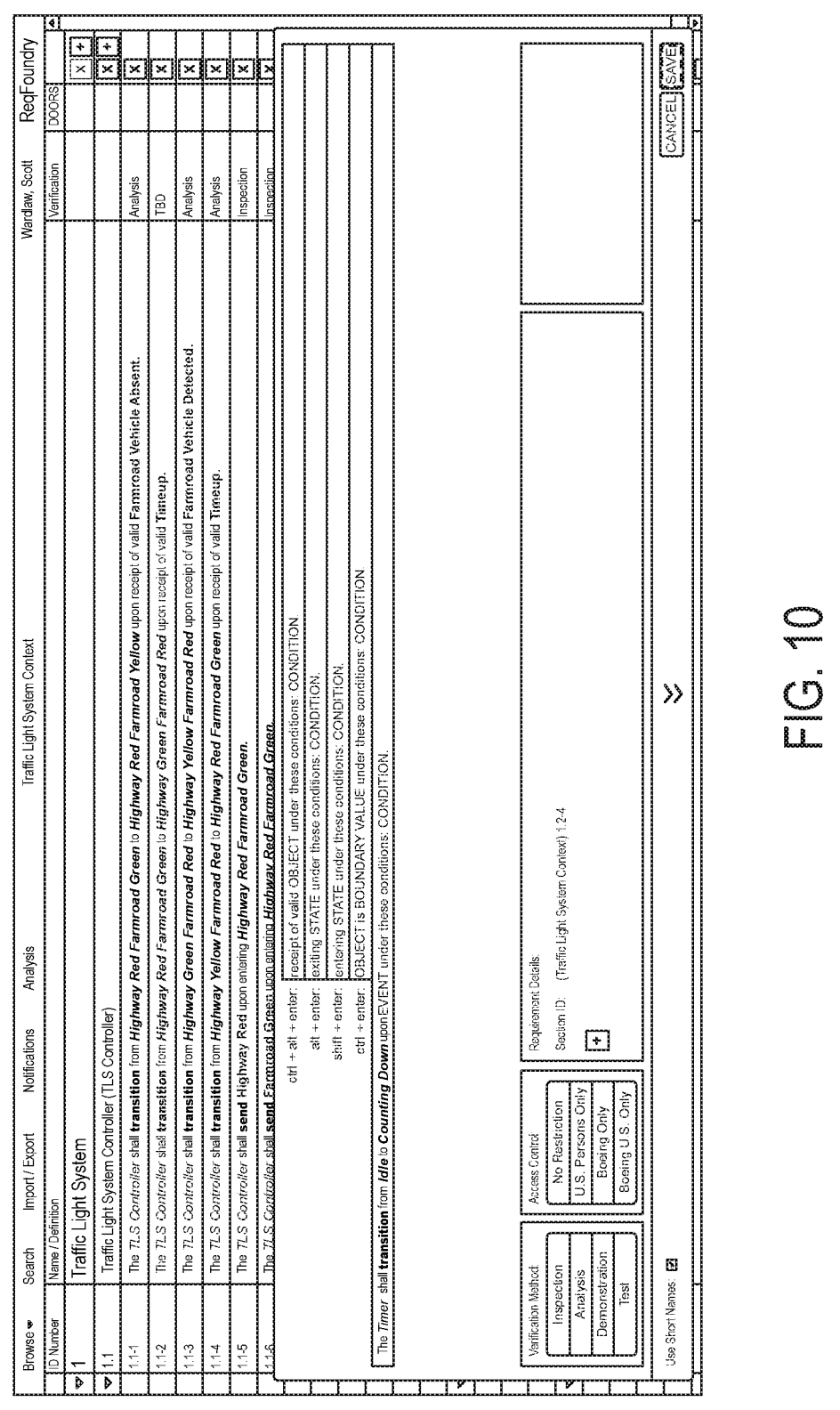

FIG. 10 shows an authoring dialog box 1000 for options for EVENT using the example of FIGS. 6-9, in accordance with examples of the present disclosure. The requirement statement "The Timer shall transition from Idle to Counting Down upon EVENT under these conditions: CONDITION." After the word "upon," one or more selections can be presented to the user in a drop down dialog box and which can be entered by a predetermined input, such as a key stroke or combination of key stokes. The one or more selections as shown in FIG. 10 include the following: "receipt of valid OBJECT under these conditions: CONDITION," which can be selected by entering ctrl+alt+enter; "exiting STATE under these conditions: CONDITION," which can be selected by entering alt+enter; "entering STATE under these conditions: CONDITION, which can be selected by entering shift+ enter; and "OBJECT is BOUNDARY VALUE under these conditions: CONDITION," which can be selected by entering ctrl+enter.

Figure 11:
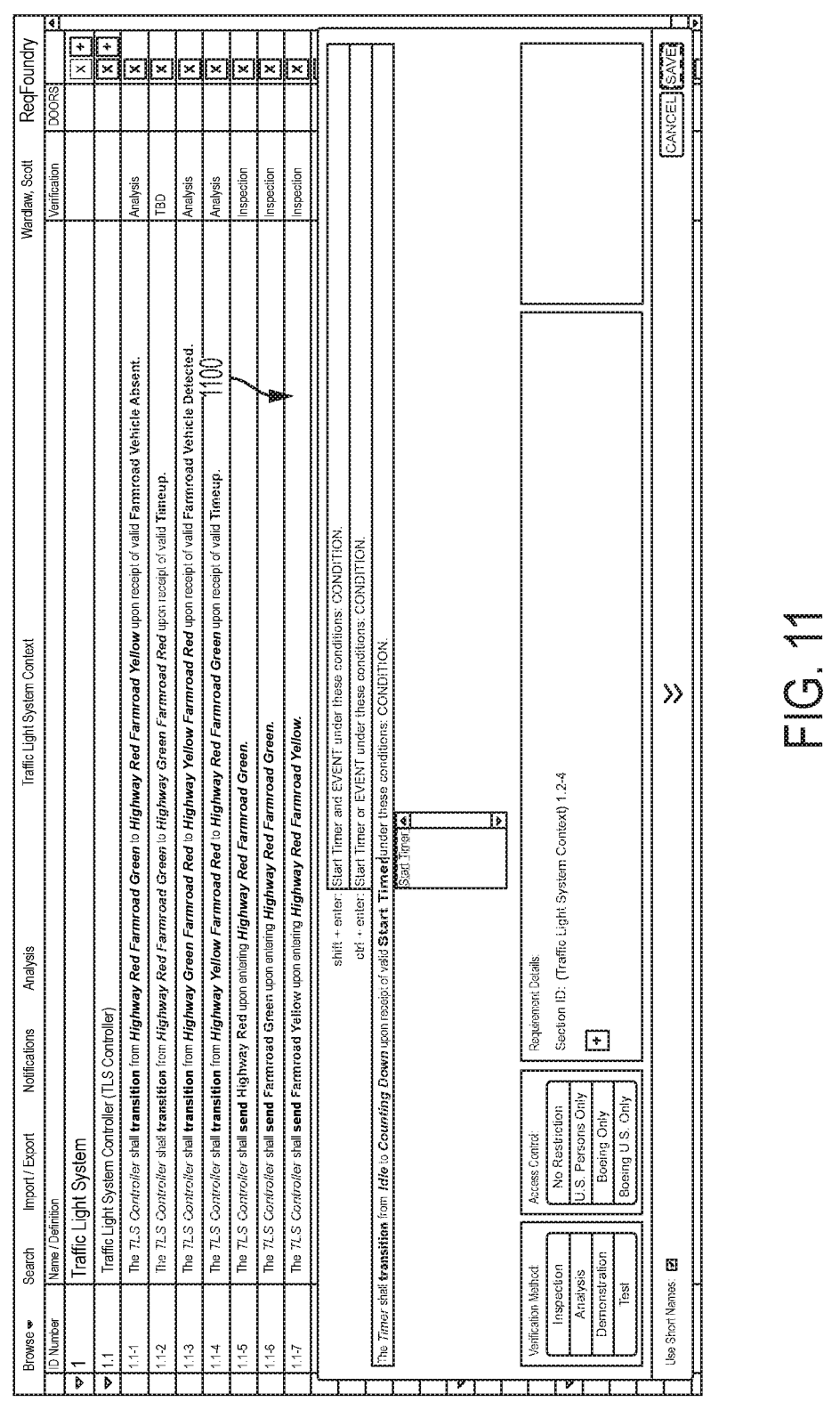

FIG. 11 shows an authoring dialog box 1100 for option to chain events using the example of FIGS. 6-10, in accordance with examples of the present disclosure. For the requirement statement "The Timer shall transition from Idle to Counting Down upon receipt of valid Start Timer under these conditions: CONDITION," a drop down dialog box is provided after the word "Start Timer" is entered. The dialog box can include one or more selections including "Start Timer and EVENT under these conditions: CONDITION," which can be selected by entering shift+enter, and "Start Timer or EVENT under these conditions: CONDITION," which can be selected by entering ctrl+enter.

FIG. 12 shows an authoring dialog box 1200 for option to add conditions using the example of FIGS. 6-11, in accordance with examples of the present disclosure. For the requirement statement "The Timer shall transition from Idle to Counting Down upon receipt of valid Start Timer under these conditions: CONDITION.

Figure 13:
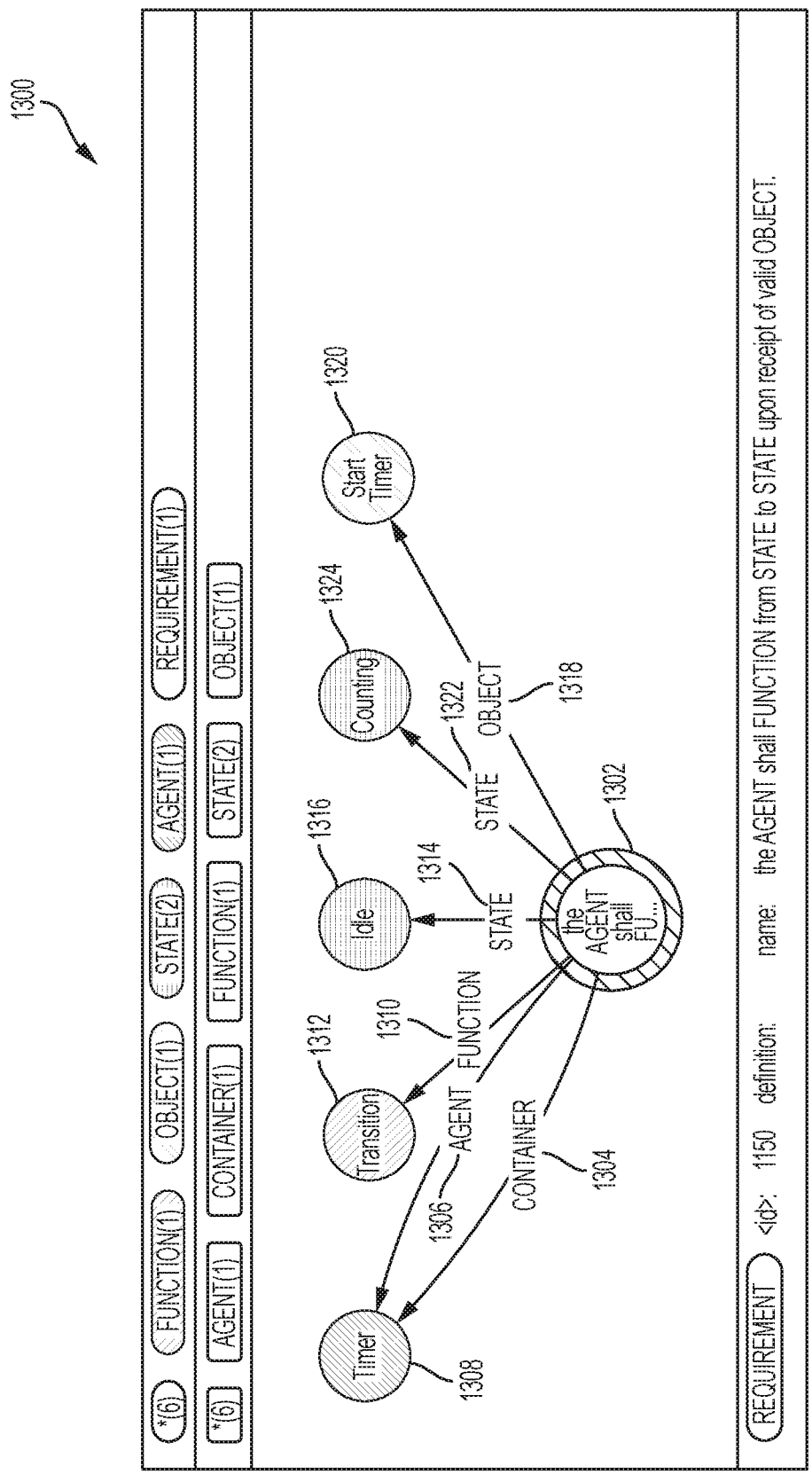
FIG. 13 shows a database structure 1300, in accordance with examples of the present disclosure.
Figure 14:
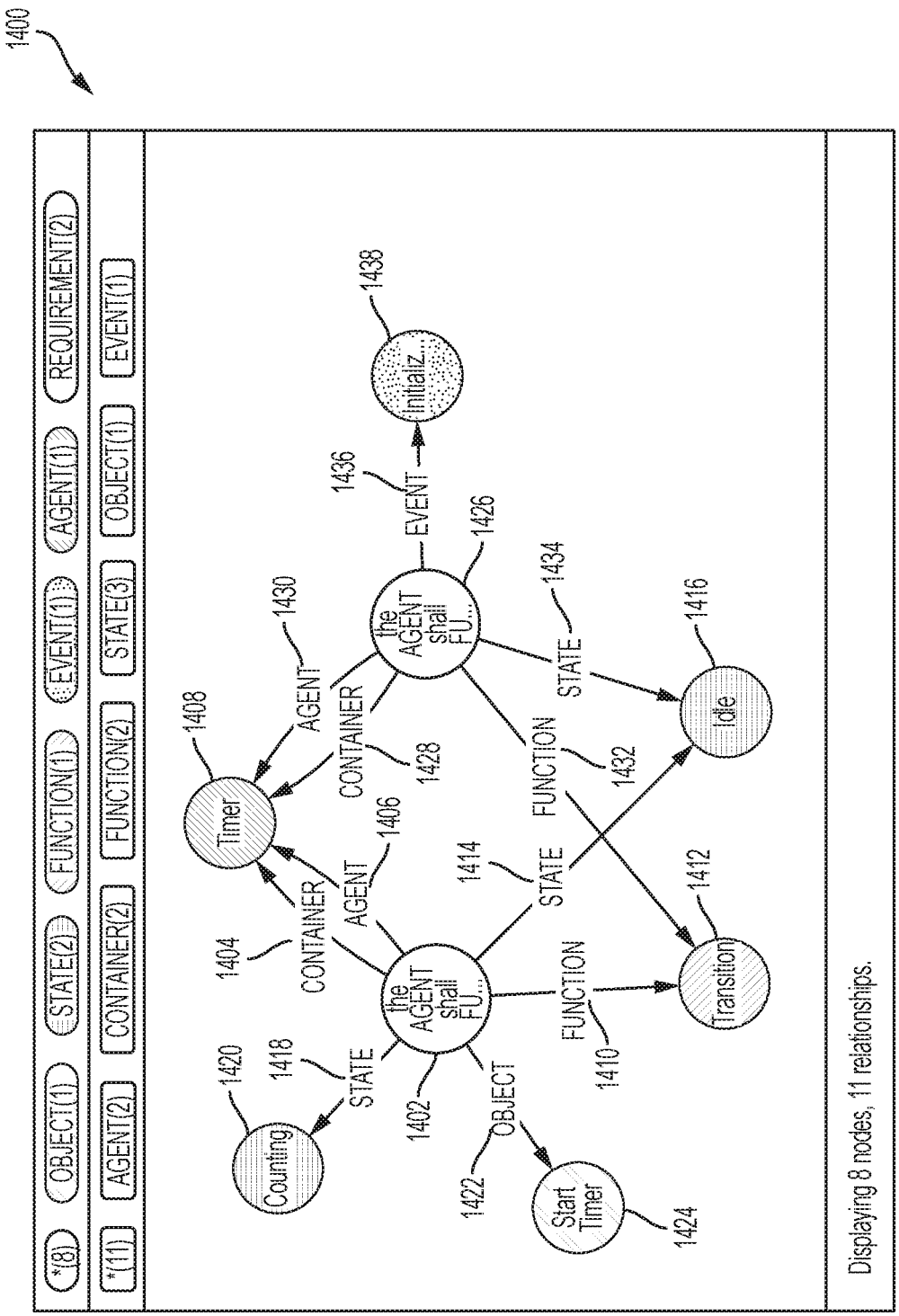
FIG. 14 shows a database structure 1400, in accordance with examples of the present disclosure.
Figure 15:
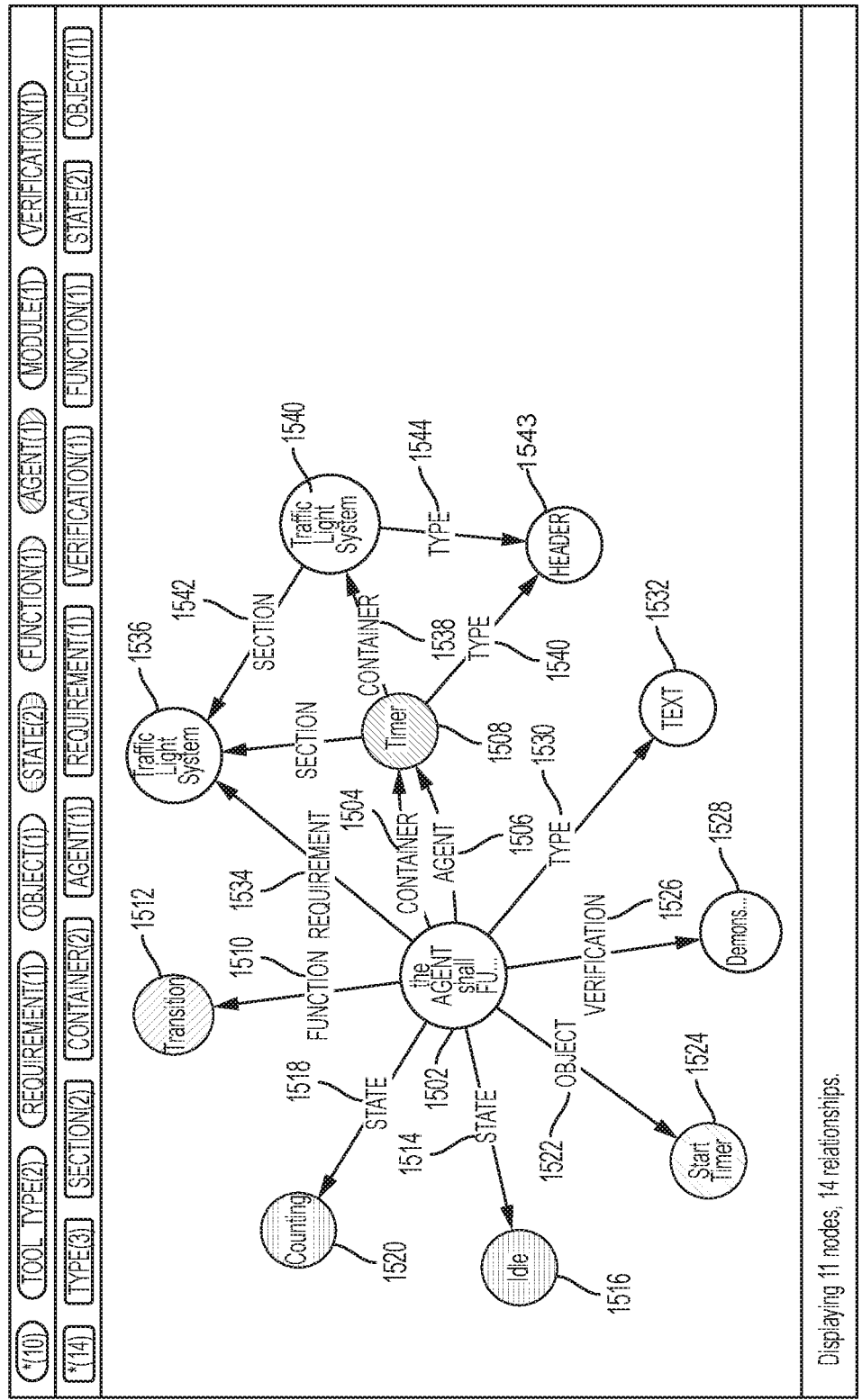
FIG. 15 show a database structure 1500, in accordance with examples of the present disclosure.

FIGS. 13-15 show a database structure for a template database, according to examples of the present disclosure. The template database can be populated with data from previous requirements documents. Each subject, verb, function, and objects of each requirements statement in a requirements document can be stored as a separate data structure or object. The data structures for related features can then be associated with each other. For example, a data structure for a subject and be associated with a data structure for data structures for the verb, function, and objects as defined in a particular requirements statement. A new or modified requirements statement can be created using one or more templates from the template database that are populated from date from previous requirements statements.

FIG. 13 shows a database structure 1300, in accordance with examples of the present disclosure. The data structure 1300 stores one or more words in a requirements statement as a single instance inside a data structure that is referenced by other electronic requirement documents that use the one or more words. The name "the AGENT shall FUNCTION from STATE to STATE upon receipt of valid OBJECT" 1302 is a container 1304 for agent 1306 Timer 1308, has a function 1310 of transition 1312, has a state 1314 of Idle 1316, is an object 1318 of Start Timer 1320, and is a state 1322 of Counting 1324.

FIG. 14 shows a database structure 1400, in accordance with examples of the present disclosure. The database structure 1400 shows 8 nodes and 11 relationships. The name "the AGENT shall FUNCTION from STATE to STATE upon receipt of valid OBJECT" 1402 is a container 1404 for agent 1406 for Timer 1408, has a function 1410 of transition 1412, has a state 1414 of Idle 1416, has a state 1418 of counting 1420, and is an object 1422 of Start Timer 1424. The name "the AGENT shall FUNCTION from STATE to STATE upon receipt of valid OBJECT" 1426 is a container 1428 for agent 1430 of Timer 1408, has a function 1432 of transition 1412, has a state 1434 of Idle 1416, has an event 1436 of initialize 1438.

FIG. 15 show a database structure 1500, in accordance with examples of the present disclosure. The database structure 1500 shows 11 nodes and 14 relationships. The name "the AGENT shall FUNCTION from STATE to STATE upon receipt of valid OBJECT" 1502 is a container 1504 for agent 1506 for Timer 1508, has a function 1510 of transition 1512, has a state 1514 of Idle 1516, has a state 1518 of counting 1520, is an object 1522 of Start Timer 1524, has a verification 1526 of Demons . . . " 1528, has a type 1530 of text 1532, and has a requirement 1534 of traffic light system 1536. The Timer 1508 is a container 1538 for traffic light system 1540, is a section 1542 of traffic light system 1536, and is a type 1540 header 1542. The traffic light system 1540 is a section 1542 of traffic light system 1536 and is a type 1544 of header 1543.

Figure 16:
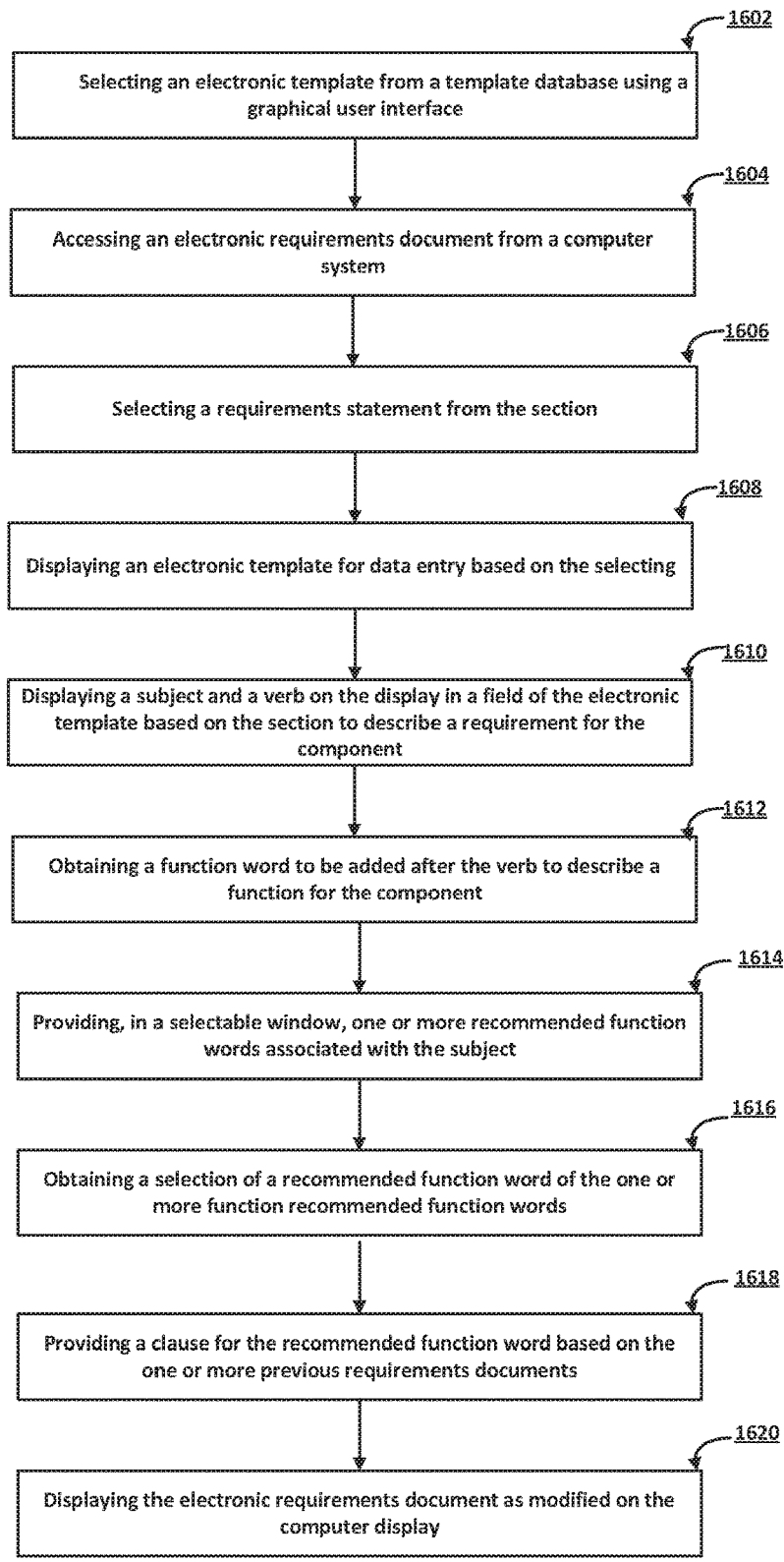
FIG. 16 shows a computer-implemented method 1600 for constructing a requirements document for a product or service, according to examples of the present disclosure.

FIG. 16 shows a computer-implemented method 1600 for authoring a requirements document for a product or service, according to examples of the present disclosure. The computer-implemented method can be executed by one or more hardware processors, such as a central processing unit (CPU) and a graphics processing unit (GPU). The computer-implemented method begins by selecting, at 1602, an electronic template from a template database using a graphical user interface. For example, the graphical user interface can be generated using the GPU. In some examples, the graphical user interface provides one or more selectable electronic templates. As shown in FIGS. 1-12, the electronic requirements document is viewable in a graphic user interface of a computer display that is provided through the peripheral interfaces 1706.

The computer-implemented method 1600 continues by accessing, at 1604, an electronic requirements document from computer system. The accessing can be executed by the CPU. For example as shown in FIG. 1, an electronic requirements document 100 for a traffic light system 102 is shown. The electronic requirements document 100 for the traffic light system 102 comprises a section for each component, including the TLS controller 104, the timer 106, and the sensor 108. The electronic requirements document 100 can be retrieved from a storage medium of a computer system, e.g., computer system 1700 or another storage medium accessible over a network interface 1708.

The computer-implemented method 1600 continues by selecting, at 1606, a requirements statement for the section. Continuing with the discussion of FIG. 1, a user can select the requirement TLS Controller shall transition from Highway Red Farmroad Green to Highway Red Farmroad Yellow upon receipt of valid Farmroad Vehicle Absent 110 under the section TLS controller 104. The user can select, using a user interface device, an identifier associated with the particular statement, such as the identifier "1.1.1" for Highway Red Farmroad Green to Highway Red Farmroad Yellow upon receipt of valid Farmroad Vehicle Absent 110 to modify this statement.

The computer-implemented method 1600 continues by displaying, at 1608, an electronic template for data entry based on the selecting. For example, as shown in FIG. 2, the electronic template in the form of a pop-up dialog box 200 is provided once the user selects the requirement statement that user wishes to view or modify. The dialog box 200 provides one or more fields that the user can select to edit.

The computer-implemented method 1600 continues by displaying, at 1610, in the electronic template, a subject and a verb in a field based on the section to describe a requirement for the component. For example, as shown in FIG. 6, in the section for timer 106, the subject of the section "The Timer" and the verb "shall" are provided in the dialog box 602. If an acronym for the subject has not been previously defined, the user can assign an acronym to the subject. The acronym and the subject can then be stored as a common data structure in a storage medium. For example, as shown in FIG. 13, the data structure or container 1302 for "The AGENT shall FU . . . " can store information about the AGENT and an acronym for the AGENT. In the example of the requirement statement 1.1-1 of FIG. 1, the Agent is the Traffic Light System and the acronym is TLS. The acronym can be defined based on previous requirements documents for the Traffic Light system that are stored in a database of templates, such as the database structure of FIG. 13-15.

The computer-implemented method 1600 continues by obtaining, at 1612, a function word to be added after the verb to describe a function for the component. Continuing with the example of FIG. 6, the function "go" is entered by the user. As shown in FIG. 13, the container 1302 for "The AGENT shall FU . . . " is associated in the database with the container 1312 for transition by the function 1310. Again, the function "go" can be defined based on previous requirements documents for the Traffic Light system that are stored in a database of templates.

The computer-implemented method 1600 continues by providing, at 1614, in a selectable window, one or more recommended function words associated with the subject. The one or more functions describe an action of subject. The one or more recommended function words are based on one or more previous requirements documents to provide a consistency in use across the one or more previous requirements documents. Continuing with the example of FIG. 6, the recommended function word "transition" is provided in a window that is used to replace the word "go." The word "go" can be provided as a synonym for the word "transition" in the template. The recommended function words can be based on previous requirements documents that are stored in the database structure of FIGS. 13-15 that use the timer 106. Again, as shown in FIG. 13, the container 1302 for "The AGENT shall FU . . . " is associated in the database with the container 1312 for transition by the function 1310. However, if the user were not provided with the recommended function word "transition," and instead used the word "go," then this requirement statement for the Timer would be different and inconsistent with other requirements statements for the Timer in other requirements documents. This could happen with other words in the requirements statements if the recommended words were not provided based on previous requirement documents. If this were to happen over a number of requirements statements, then requirements documents would differ in usage of terms and/or units, which could result in errors in the products or services that the requirements document are meant to describe.

The computer-implemented method 1600 continues by obtaining, at 1616, a selection of a recommended function word of the one or more function recommended function words. For example, as shown in FIG. 7, the user selects the word "transition" from the recommended function words provided in FIG. 6.

The computer-implemented method 1600 continues by providing, at 1618, a clause for the recommended function word based on the one or more previous requirements documents. The clause comprises one or more words that can be selected to provide recommended replacement words. Continuing with the example of FIG. 7, the clause "from STATE to STATE within a BOUNDARY of VALUE upon EVENT under these conditions: CONDITION" is provided for the function "transition." Again, the clause can be provided from the database structure of FIGS. 13-15. The words in capital letters, e.g., BOUNDARY, VALUE, EVENT, and CONDITION, represent words that the user can select to modify. Initially, a first word in the clause is selectable and the remaining words are not selectable and can be displayed in greyed-out format. FIG. 8, the first word "STATE" is selected and one or more recommended replacement words are provided in a dialog box 802, i.e., in a pop-up window. The one or more recommended replacement words in this example for STATE include: "Highway Green FarmRoad Red," "Highway Red Farmroad Yellow," "Highway Red Farmroad Green," and "Highway Yellow Farmroad Red." Again, as shown in FIG. 13, the container 1302 for "The AGENT shall FU . . . " is associated in the database with the containers for the clause "from STATE to STATE upon receipt of valid OBJECT," where the words in all capital are the words are that selectable to be modified. As shown, the two states 1314 and 1322 are Idle and Counting, respectively, and the object 1318 is Start Timer. The container 1302 for "The AGENT shall FUN . . . " is associated in the database with the container 1316 for "Idle" and with the container 1324 for "Counting." Also, the container 1302 for "The AGENT shall FUN . . . " is associated in the database with the container 1320 for Start Timer.

In some examples, a word in the clause may have units associated with it. If the units provided differ than units associated with the word as defined in the data structure for that word, then alternative units are provided to maintain consistency of units among different requirements statements. The hardware processor can determine if units associated with a word in the requirement statement match units defined in the electronic template.

In some example, a keyboard entries or shortcut can be associated to each of the one or more recommended function word for selection of the one or more recommended function word. As shown in FIG. 10, a ctrl+alt+enter shortcut is associated with the clause "receipt of valid OJBECT under these conditions: CONDITION," a alt+enter shortcut is associated with the clause "existing STATE under these conditions: CONDITION," a shift+enter shortcut is associated with the clause "entering STATE under these conditions: CONDITION," and a ctrl+enter shortcut is associated with the clause "OBJECT is BOUNDARY VALUE under these conditions: CONDITION."

The computer-implemented method 1600 continues by displaying, at 1620, the electronic requirements document as modified on a computer display. As shown, in each of the examples of FIGS. 1-12 in a graphic user interface of a computer display that is provided through the peripheral interfaces 1706.

In some examples, the words in the requirements statement can be displayed in a format that is based on a context of word. For example, the context can be based on the grammatical contraction of the requirement statement, where one format is used for the subject, another format is used for the verb, and yet another format is used for the clause. The format can be a color, a font, a border, a shape, a highlight, or combinations thereof.

As shown in FIGS. 13-15, the electronic requirements document is stored in a storage medium, wherein one or more words in the requirements statement are stored as a data structure that is associated with other electronic requirement documents that use the one or more words. For example, as shown in FIG. 13, the phrase including the subject and verb "The AGENT shall FU . . . " is stored in a data structure or object, e.g., container 1302, and is associated in the storage medium with other data structures or objects, e.g., containers 1308, 1312, 1316, 1320, and 1324. In some examples, a change in a word in the requirements statement is changed in other requirements documents that use the word. In some examples, a data structure that stores the subject is associated with a data structure for each of word of the clause.

By using the data structures shown in FIGS. 13-15 to create a new requirements document or modify an existing requirements document using the templates described above, the techniques described herein provide for a level of consistency among requirements beyond that of the conventional methods. The previous requirements documents that are used to create and/or modify new requirements statements or documents provide a common vocabulary and structure that allows for consistent usage of terms, such as subjects, verbs, functions, and objects in a requirement statement. By storing these terms as separate, but connected or associated, data structures in a template database, the authoring of new requirements is greatly improved. In this way, different requirements documents using the same component of a system can be described using the same vocabulary and using the same measurement units, which will greatly reduce the possibility of errors in the systems described by the requirements documents.

Figure 17:
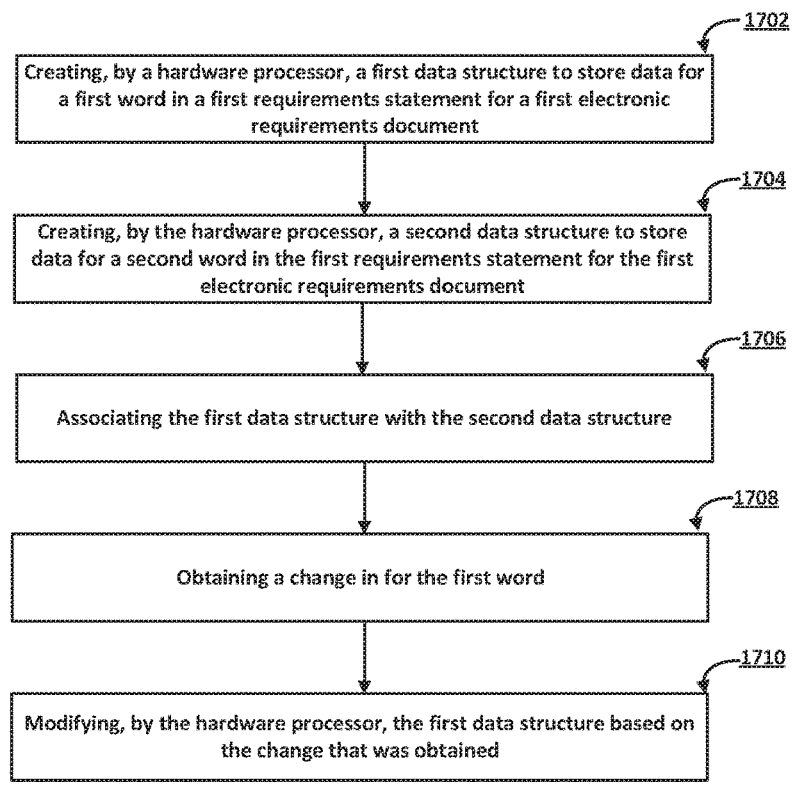
FIG. 17 shows a computer-implemented method 1700 of storing data for an electronic requirements document, according to examples of the present disclosure.

FIG. 17 shows a computer-implemented method 1700 of storing data for an electronic requirements document. The computer-implemented method 1700 comprises creating, at 1702, by a hardware processor, a first data structure to store data for a first word in a first requirements statement for a first electronic requirements document. The computer-implemented method 1700 continues by creating, at 1704, by the hardware processor, a second data structure to store data for a second word in the first requirements statement for the first electronic requirements document, wherein the second word describes a function of the first word. For example, as shown in FIG. 13, the phrase including the subject and verb "The AGENT shall FU . . . " is stored in a data structure or object, e.g., container 1302, and is associated in the storage medium with other data structures or objects, e.g., containers 1308, 1312, 1316, 1320, and 1324.

The computer-implemented method 1700 continues by associating, at 1706, the first data structure with the second data structure. Continuing with the example of FIG. 13, the container 1308 for "The AGENT shall FU . . . " is associated with container 1308 for "Timer," is associated with container 1312 "Transition," is associated with container 1316 for "Idle," etc.

The computer-implemented method 1700 continues by obtaining, at 1708, a change in for the first word. For example, the user can select a word in a requirements statement and a template can be provided. The user can then make a change to the word in template. The computer-implemented method 1700 continues by modifying, at 1710, by the hardware processor, the first data structure based on the change that was obtained. The first data structure that is modified is reflected in a second requirements document that uses the first word.

Figure 18:
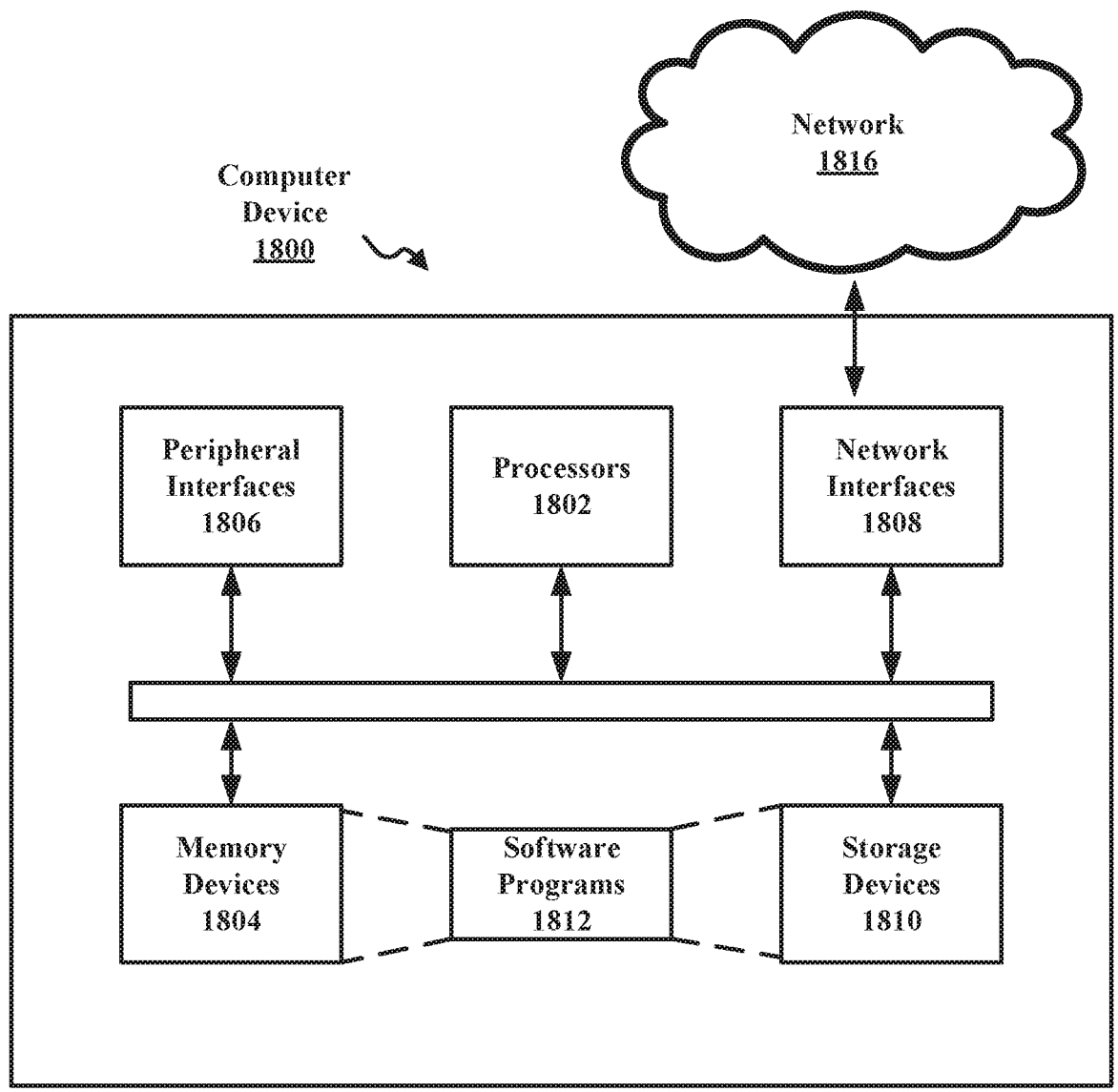
FIG. 18 illustrates an example of a hardware configuration for a computer device 1800, which can be used to perform one or more of the processes described above.

FIG. 18 illustrates an example of a hardware configuration for a computer device 1800, which can be used to perform one or more of the processes described above. The computer device 1800 can be any type of computer devices, such as desktops, laptops, servers, etc., or mobile devices, such as smart telephones, tablet computers, cellular telephones, personal digital assistants, etc. As illustrated in FIG. 18, the computer device 1800 can include one or more processors 1802 of varying core configurations and clock frequencies. The computer device 1800 can also include one or more memory devices 1804 that serve as a main memory during the operation of the computer device 1800. For example, during operation, a copy of the software that supports the above-described operations can be stored in the one or more memory devices 1804. The computer device 1800 can also include one or more peripheral interfaces 1806, such as keyboards, mice, touchpads, computer screens, touchscreens, etc., for enabling human interaction with and manipulation of the computer device 1800. The computer displays can be configured to display a graphic user interface.

The computer device 1800 can also include one or more network interfaces 1808 for communicating via one or more networks, such as Ethernet adapters, wireless transceivers, or serial network components, for communicating over wired or wireless media using protocols. The computer device 1800 can also include one or more storage device 1810 of varying physical dimensions and storage capacities, such as flash drives, hard drives, random access memory, etc., for storing data, such as images, files, and program instructions for execution by the one or more processors 1802.

Additionally, the computer device 1800 can include one or more software programs 1812 that enable the functionality described above. The one or more software programs 1812 can include instructions that cause the one or more processors 1802 to perform the processes described herein. Copies of the one or more software programs 1812 can be stored in the one or more memory devices 1804 and/or on in the one or more storage devices 1810. Likewise, the data utilized by one or more software programs 1812 can be stored in the one or more memory devices 1804 and/or on in the one or more storage devices 1810.

In implementations, the computer device 1800 can communicate with other devices via a network 1816. The other devices can be any types of devices as described above. The network 1816 can be any type of network, such as a local area network, a wide-area network, a virtual private network, the Internet, an intranet, an extranet, a public switched telephone network, an infrared network, a wireless network, and any combination thereof. The network 1816 can support communications using any of a variety of commercially-available protocols, such as TCP/IP, UDP, OSI, FTP, UPnP, NFS, CIFS, AppleTalk, and the like. The network 1816 can be, for example, a local area network, a wide-area network, a virtual private network, the Internet, an intranet, an extranet, a public switched telephone network, an infrared network, a wireless network, and any combination thereof.

The computer device 1800 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1800 as described above need not be enclosed within a single enclosure or even located in close proximity to one another. Those skilled in the art will appreciate that the above-described componentry are examples only, as the computer device 1800 can include any type of hardware componentry, including any necessary accompanying firmware or software, for performing the disclosed implementations. The computer device 1800 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. For example, the graphical user interface can be generated by a graphics processing unit on a graphics card on the computer device 1800.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A computer-implemented method for authoring a requirements document for a product or service, the computer-implemented method using one or more hardware processors comprising:
    selecting a first electronic template from a template database using a graphical user interface;
    accessing an electronic requirements document from a computer system, wherein the electronic requirements document comprises a section for a component of the product or service;
    selecting a requirements statement from the section;
    providing a second electronic template for data entry based on the selecting;
    displaying a subject and a verb in a field of the electronic template based on the section to describe a requirement for the component;
    obtaining a function word to be added after the verb to describe a function for the component;
    providing, in a selectable window, one or more recommended function words associated with the subject, wherein the one or more function words describe an action of subject;
    obtaining a selection of a recommended function word of the one or more recommended function words;
    providing a clause for the recommended function word, wherein the clause comprises one or more words that can be selected to provide recommended replacement words; and
    displaying the electronic requirements document as modified on a computer display.

2. The computer-implemented method of claim 1, wherein the one or more words in the clause are uniquely identifiable for a context of a word for the user to enter text, to which, related suggested words are displayed.

3. The computer-implemented method of claim 1, further comprising displaying words in the requirements statement in a format that is based on a context of each word.

4. The computer-implemented method of claim 3, wherein the format is a color, a font, a border, a shape, a highlight, or combinations thereof.

5. The computer-implemented method of claim 1, further comprises storing the electronic requirements document in a storage medium, wherein one or more words in the requirements statement are stored as a single instance inside a data structure that is referenced by other electronic requirement documents that use the one or more words.

6. The computer-implemented method of claim 1, further comprising determining units associated with a word in the requirements statement as defined in the second electronic template.

7. The computer-implemented method of claim 1, further comprising associating a keyboard entries to each of the one or more recommended function words for selection of the one or more recommended function word.

8. The computer-implemented method of claim 1, wherein the requirements statement that is selected comprises obtaining a selection of an identifier associated with the requirement statement.

9. The computer-implemented method of claim 1, further comprising assigning an acronym to one or more words of specific context, wherein the acronym and the one or more words of specific context are stored as a common data structure in a storage medium.

10. The computer-implemented method of claim 1, wherein the one or more recommended function words are based on an input from the user, a list of words of a certain type, one or more previous requirements documents to provide a consistency in use across the one or more previous requirements documents, or combinations thereof.

11. The computer-implemented method of claim 1, wherein a change in one or more words of specific context in the requirements statement are changed in other requirements documents that reference the same one or more words of specific context.

12. The computer-implemented method of claim 1, wherein a data structure that stores the subject is associated with a data structure for each of word of the clause.

13. A computer system comprising:
    one or more hardware processors;
    a non-transitory computer readable storage medium configured to store instructions, that when executed by the one or more hardware processors, perform a method for constructing an electronic requirements document for a product or service, the method comprising:
    selecting a first electronic template from a template database using a graphical user interface;

accessing an electronic requirements document from the computer system, wherein the electronic requirements document comprises a section for a component of the product or service;

selecting a requirements statement from the section;

providing a second electronic template for data entry based on the selecting;

displaying a subject and a verb in a field based on the section to describe a requirement for the component;

obtaining a function word to be added after the verb to describe a function for the component;

providing, in a selectable window, one or more recommended function words associated with the subject, wherein the one or more function words describe an action of subject;

obtaining a selection of a recommended function word of the one or more recommended function words;

providing a clause for the recommended function word, wherein the clause comprises one or more words that can be selected to provide recommended replacement words; and displaying the electronic requirements document as modified to be displayed on a computer display.

14. The computer system of claim 13, wherein the one or more words in the clause are uniquely identifiable for a context of a word for the user to enter text, to which, related suggested words are displayed.

15. The computer system of claim 13, further comprising displaying words in the requirement statement in a format that is based on a context of each word.

16. The computer system of claim 13, further comprising displaying words in the requirements statement in a format that is based on a context of each word.

17. The computer system of claim 16, wherein the format is a color, a font, a border, a shape, a highlight, or combinations thereof.

18. The computer system of claim 16, further comprises storing the electronic requirements document in a storage medium, wherein one or more words in the requirements statement are stored as a single instance inside a data structure that is associated with other electronic requirement documents that use the one or more words.

19. The computer system of claim 13, wherein the requirements statement that is selected comprises obtaining a selection of an identifier associated with the requirements statement.

20. A computer-implemented method of storing data for an electronic requirements document, the computer-implemented method comprising:

creating, by a hardware processor, a first data structure to store data for a first word in a first requirements statement for a first electronic requirements document;

creating, by the hardware processor, a second data structure to store data for a second word in the first requirements statement for the first electronic requirements document, wherein the second word describes a function of the first word;

associating the first data structure with the second data structure;

obtaining a change in for the first word; and modifying, by the hardware processor, the first data structure based on the change that was obtained, wherein the first data structure that is modified is reflected in a second requirements document that uses the first word.

* * * * *